(12) United States Patent
Holmeide (10) Patent No.: US 10,404,552 B2
(45) Date of Patent: Sep. 3, 2019

(54) TIME-STAMPING DATA PACKETS IN A NETWORK TAP ELEMENT

(71) Applicant: OnTime Networks AS, Oslo (NO)

(72) Inventor: Øyvind Holmeide, Oslo (NO)

(73) Assignee: OnTime Networks AS, Oslo (NO)

( * ) Notice: Subject to any disclaimer, the term of this patent is extended or adjusted under 35 U.S.C. 154(b) by 158 days.

(21) Appl. No.: 14/668,521

(22) Filed: Mar. 25, 2015

(65) Prior Publication Data

US 2016/0285575 A1 Sep. 29, 2016

(51) Int. Cl.
*H04J 3/06* (2006.01)
*H04L 12/26* (2006.01)

(52) U.S. Cl.
CPC ............ *H04L 43/00* (2013.01); *H04J 3/0673* (2013.01); *H04L 43/106* (2013.01)

(58) Field of Classification Search
CPC ..... H04L 47/11; H04L 12/5693; H04L 45/16; H04L 43/08; H04L 45/24; H04L 43/0858; H04L 43/106; H04J 3/0632; G06F 3/14; G06F 17/30902
See application file for complete search history.

(56) References Cited

U.S. PATENT DOCUMENTS

| | | | | |
|---|---|---|---|---|
| 8,780,706 B1* | 7/2014 | Donner | ................... | H04L 45/16 370/229 |
| 2003/0182390 A1* | 9/2003 | Alam | ................ | G06F 17/30902 709/216 |
| 2005/0036512 A1* | 2/2005 | Loukianov | ............ | H04J 3/0632 370/469 |
| 2005/0081117 A1* | 4/2005 | Gibart | ................. | H04L 43/0858 714/47.2 |
| 2009/0144424 A1* | 6/2009 | Takeda | ................ | H04L 12/5693 709/226 |
| 2009/0175397 A1* | 7/2009 | Lee | ........................... | G06F 3/14 375/376 |
| 2011/0205912 A1* | 8/2011 | Leong | ..................... | H04L 47/11 370/252 |
| 2014/0101305 A1* | 4/2014 | Kelley, Jr. | ............... | H04L 45/24 709/224 |
| 2014/0241181 A1* | 8/2014 | Barrass | ................... | H04L 43/08 370/252 |
| 2015/0023203 A1* | 1/2015 | Odell | .................... | H04L 43/106 370/253 |

* cited by examiner

Primary Examiner — Vinncelas Louis
(74) Attorney, Agent, or Firm — David H. Judson (57) ABSTRACT

Digital communications receive signals from the network tap represent "tapped" data. The tapped data is forwarded to a time stamp module. The time stamp module generates a time stamp and inserts the time stamp in each packet body. The time stamp represents a "time" when data packet content is considered to be generated at a sending node from which the tapped data originates. A packet time-stamped in this manner is then forwarded to one or more receivers, such as the recorder for additional processing. One such processing may be a performance measurement based at least in part on the time stamp that, as described, represents the time at which data packet content is considered to have been generated by the sending node. The network tap may be filterable, and either copper-based or a fiber tap.

20 Claims, 6 Drawing Sheets

TIME-STAMPING DATA PACKETS IN A NETWORK TAP ELEMENT

BACKGROUND

Technical Field

This application relates generally to monitoring, analysis, processing and recording of data packets in a network using a network tap device.

Brief Description of the Related Art

In many cases, it is desirable to monitor the traffic between two points in a network. A network tap is a hardware device which provides a way to access the data flowing across a network. It typically has a number of ports: a first port, a second port, and one or more monitor ports. A tap inserted between the first and second ports passes all traffic through unimpeded, but also copies that same data to a monitor port. A "filterable" network tap, which is commonly-used in a 10 Gigabit environment, provides advanced filtering. It can selectively pass data, e.g., based on application, VLAN ID, or other parameters, to a 1-Gigabit port for deep analysis and monitoring. Once a network tap is in place, the network can be monitored without interfering with the network itself. Likewise, a monitoring device can be connected to the tap as-needed without impacting the monitored network. Some taps operate at the physical layer of the 7 layer OSI model rather than the data link layer. This means that they can work with most data link network technologies that use that physical media, such as ATM and some forms of Ethernet. Network taps that act as simple optical splitters, sometimes called passive taps, may operate in this manner.

By way of additional background, modern time synchronization for data acquisition and recording systems often implement the Precisions Time Protocol (PTP) according to the IEEE 1588 standard. Time synchronization in a network based on IEEE1588 (or NTP/SNTP) is based on time-stamping of incoming and outgoing time packets on a time server (time source), and on time clients. In this approach, a PTP Ground Master Clock of a network is the common time base source for all PTP Slave Clocks within the network. The switches in a PTP network may have PTP Transparent Clock or Boundary Clock support. Time synchronization packets forwarded through a switch with PTP Transparent Clock support do not suffer from variable switch latency. The switches in the network preferably have Slave Clock support, meaning they are synchronized with the PTP Slave Clock end devices to the same Grand Master Clock. A switch on the edge of the network can also provide non-PTP interfaces with time synchronization output signals to distribute time to non-PTP end devices. The Transparent Clock (TC) mode preferably is implemented in each network switch. The TC functionality corrects the residual latency introduced by the network node. It also adjusts the time stamp in accordance with the switch residence time and forwards the synchronization messages to the next network node in the chain.

In the context of a network tap that implements the IEEE1588 standard, the clock used for time stamp generation can be based on a PTP Slave Clock implementation, NTP/SNTP client, built-in GPS receiver, or similar techniques for disciplining the network tap clock.

BRIEF SUMMARY

This disclosure describes a method operable on a network tap element for copying and forwarding (to other network devices) data packets out of a data stream for various purposes, such as monitoring, analysis, processing and recording, and where the tapped data is time-stamped.

According to an embodiment of this disclosure, digital communications receive signals from the network tap represent "tapped" data. These receive signals are packet-based and thus comprise a stream of data packets. The tapped data is forwarded to a time stamp module. The time stamp module generates a time stamp and inserts the time stamp in each packet e.g., in the packet body, or the packet header. The time stamp represents a "time" when the data packet content is considered to be generated at a sending node from which the tapped data originates. The inserted time stamp also may be compensated to account for the propagation time between the sending node and the network tap. A packet time-stamped in this manner is then forwarded to one or more receivers, such as a recorder, for additional processing. When the network tap element is a filterable network tap, this additional processing may include filtering by a packet filtering module, where any packet field in the packet can be used as a filtering criterion for either passing or dropping the packet.

According to another aspect, the time-stamped packet generated in this manner is received at a processing element that then performs an operation, e.g., a performance measurement, based at least in part on the time stamp that, as described above, represents the time at which the data packet content is considered to have been generated by the sending node.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
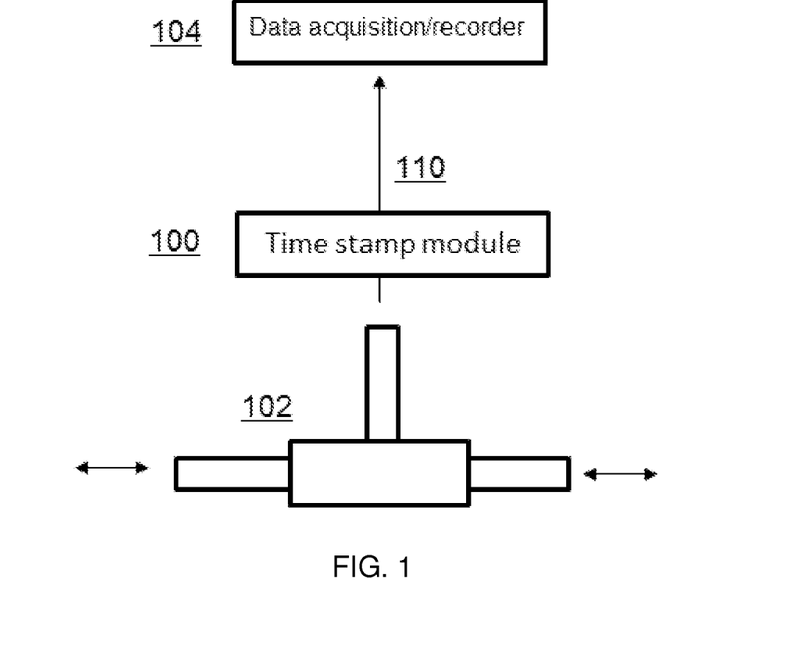
FIG. 1 depicts a data acquisition and recorder system according to this disclosure associated with a network tap having a single monitor port.
Figure 2:
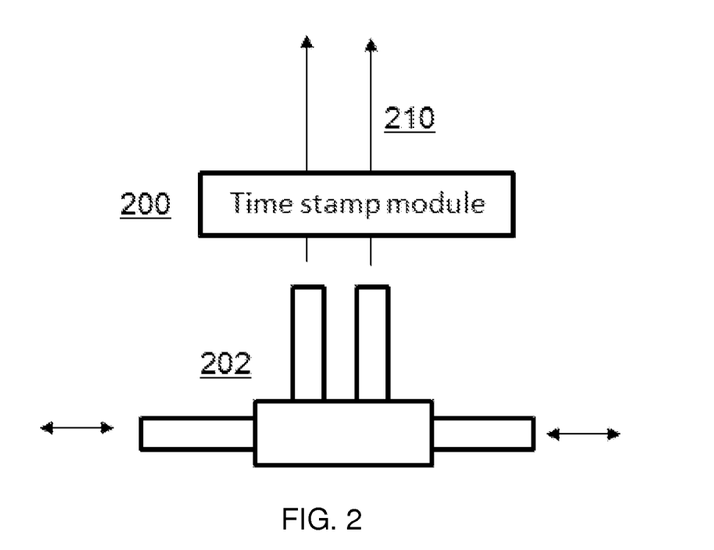
FIG. 2 depicts the system of FIG. 1 implemented with a network tap having a pair of monitor ports.

As described above, the techniques of this disclosure may be implemented in a device associated with a network tap. A representative operating embodiment is illustrated in FIG. 1, and time synchronization is presumed to be based on IEEE1588 (or NTP/SNTP, built-in GNSS receiver, or the like). Here, a time stamp module 100 is located between a filterable network tap 102, and a data acquisition and recording system 104. As is known, the network tap 102 typically is a hardware device which provides a way to access the data flowing across a network. In many cases, it is desirable to monitor the traffic between two points in the network. To facilitate this monitoring, and as depicted, the network tap 102 typically has a number of ports: a first port 106, a second port 108, and at least one monitor port 110. The first and second ports are the tap ports. FIG. 2 illustrates an alternative embodiment of the network tap 202 have a pair of monitor ports 210 coupled to the recording system (not shown here). As is well-known, a tap inserted between the first port and the second port passes all traffic through unimpeded, but also copies that same data to its monitor port 110/210, enabling monitoring. The monitored traffic is sometimes referred to as the pass-through traffic, while the ports that are used for monitoring are the monitor ports. In one embodiment, the tap is a filterable network tap. A tap of this type is commonly used in a 10 Gigabit environment. A filterable tap, which provides advanced filtering, can selectively pass data (e.g., based on application, VLAN ID, or other parameters) to the 1-Gigabit port for deep analysis and monitoring, including IDS requirements.

As will be described, and according to this disclosure, a tap is provided with support for inserting time stamps in mirrored data packets. Such packets are referred to herein as "tapped data." The technique is not limited to any particular type of tap, and the tap may be implemented in a standalone manner, or as part of another device (e.g., a receiver, a switch, a network time server, or the like).

Figure 3:
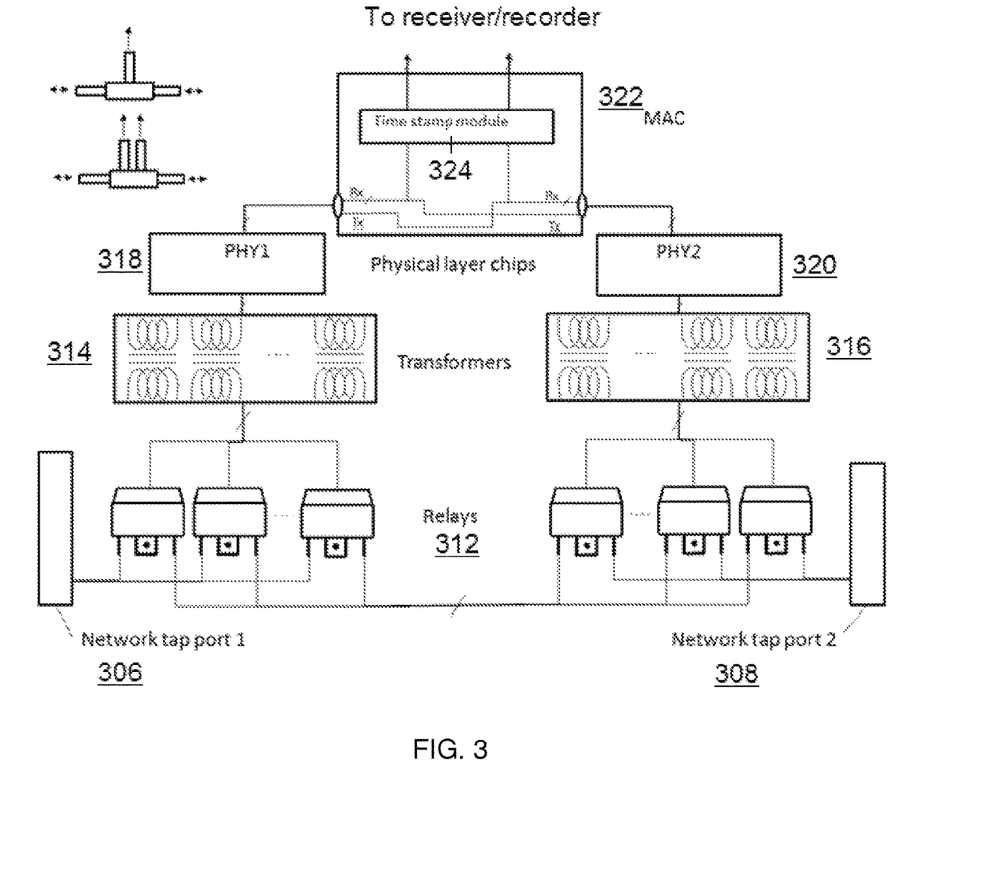
FIG. 3 depicts a first embodiment of a filterable network tap element and time stamp module of this disclosure.

Referring now to FIG. 3, an embodiment of the disclosed subject matter is depicted. In this example, the tap with support for inserting time stamps in mirrored data packets comprises part of another element, such as a receiver, a switch, a network time server, or the like. The tap may be a filterable network tap, but this is not a limitation, as noted. The techniques herein may be implemented in other network devices. By way of example only, the network tap is a component of a GNSS Network Time Server (NTS) for NTP or PTP IEEE 1588 that provides secure, accurate and reliable time synchronization for networks and offers integrated fully managed switch capabilities for 8 (10/100/1000BASE) Gigabit Ethernet ports. A representative product of this type is Cloudberry CM-1600-NTS series with built-in GPS receiver, available from OnTimeNetworks, AS. A Network Time Server (NTS) for NTP or PTP IEEE 1588 provides secure, accurate and reliable time synchronization for networks and offers integrated fully managed switch capabilities for 8 (10/100/1000BASE) Gigabit Ethernet ports. Devices of this type are operative to provide exact time over Ethernet either based on the well-established NTP/SNTP protocol, or via PTP according to IEEE 1588 Standard 2002 or IEEE 1588 Standard 2008. An NTS is used for applications that require reliable timing to accurately synchronize networks, systems, and devices and to log events with legally traceable time. Generally, a device of this type provides network master clocks (NTP or PTP), monitoring and management capabilities, and software to deliver high performance timing for network applications and devices. Such devices may also provide for remote login and file transfer capabilities.

Figure 4:
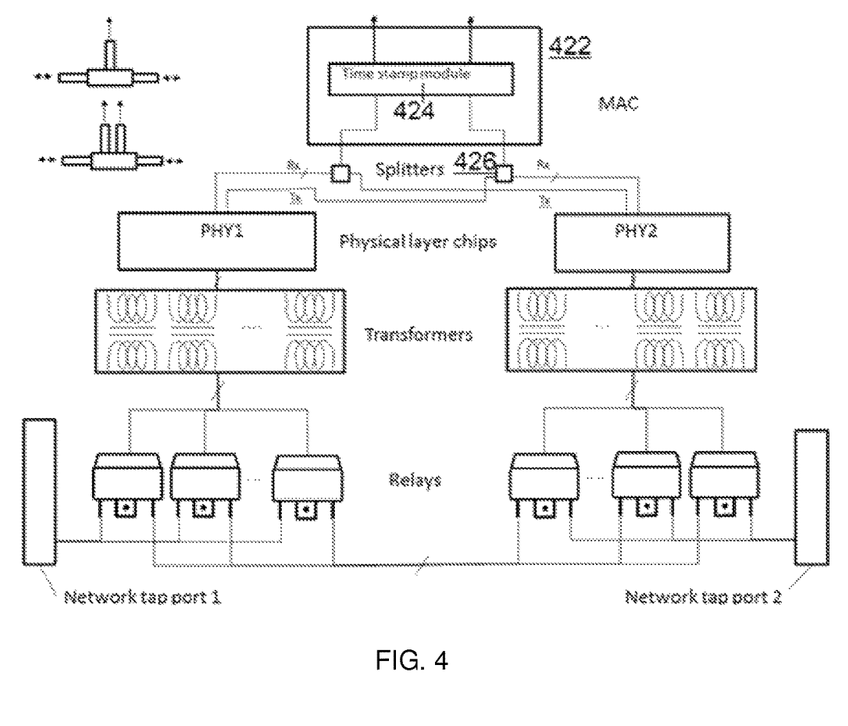
FIG. 4 is a variant of FIG. 3 that includes an additional pair of splitter elements.

Referring back to FIG. 3, the network tap element 300 comprises network tap ports 306 and 308 (which correspond to the ports in FIG. 1). Relays 312 are positioned between the tap ports 306 and 308. Data packets relayed across the network tap ports are coupled, via transformers 314 and 316, to physical layer chips 318 and 320, substantially as depicted. According to this disclosure, a media access controller (MAC) 322, which includes a time stamp module 324, is coupled between the physical layer chips 318 and 320. FIG. 4 provides a similar configuration, except that an additional set of splitters 426 are interposed between the physical layer chips 418 and 420, and the time stamp module MAC 422 and its time stamp module 424.

FIG. 3 and FIG. 4 illustrate a network tap element that is a copper tap. With reference to FIG. 3, when the network tap is powered and started, it is tested for malfunction. If no malfunction is detected, the relays 312 are configured so that modulated communication signals from each of the tap ports 306 and 308 are coupled to their respective physical layer chips 318 and 320 via magnetic couplers 314 and 316. The physical layer chips 318 and 320 take these modulated communication signals and perform demodulation and other signal processing, and output digital communication receive signals for each of the tap ports. The digital communication receive signals are input to the MAC 322 where they can be processed by the time stamp module 324, as will be further described below.

If, however, the network tap is not powered, is starting, or a malfunction is detected on the element, the tap ports 306 and 308 are simply connected via the relays 312 and signals are not provided to the physical layer chips. This is a by-pass (fail-safe) operational mode.

In the variant embodiment in FIG. 4, the modulated communication signals are coupled to the physical layer chips and processed, and the result digital communication receive signals for each of the tap ports are then split into two sets by the splitters 426. As depicted, a first set is connected to a digital communication transmit interface Tx of the physical layer chip associated with the other tap port, and the second set represents tapped data for further processing by the time stamp module.

Figure 5:
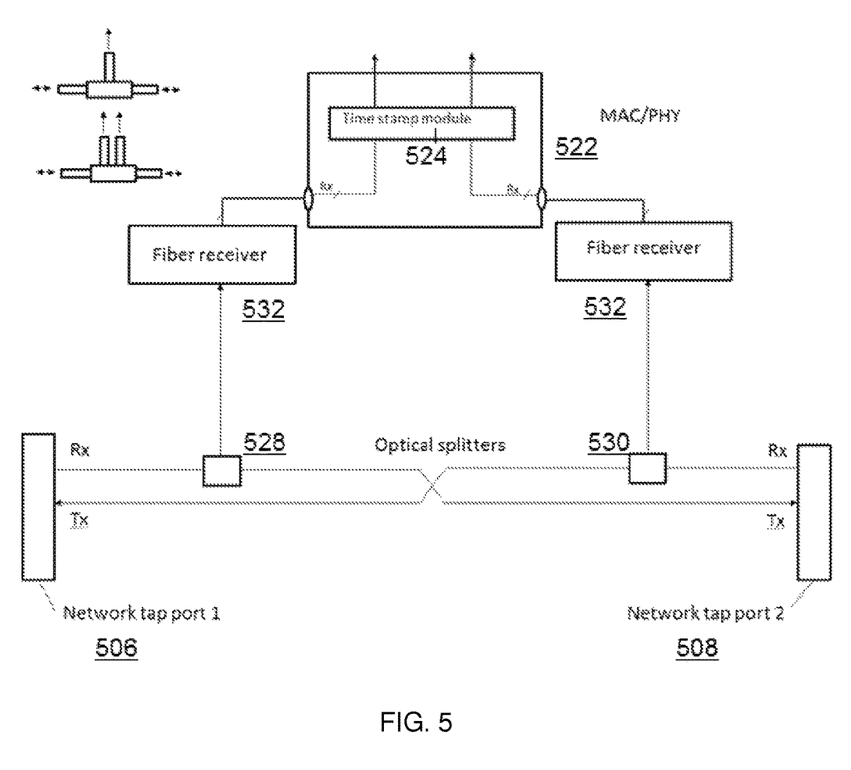
FIG. 5 depicts an alternative embodiment wherein the network tap element is a fiber tap.

In FIG. 5, the network tap element is a fiber tap. In this embodiment, the two optical tap ports 506 and 508 are connected via two optical splitters 528 and 530. As depicted, the optical receive signal Rx from each of the tap ports is then connected via a splitter to a fiber transceiver or receiver 532. The output of the receiver 532 is then coupled to the MAC 522 and its time stamp module 524.

Figure 6:
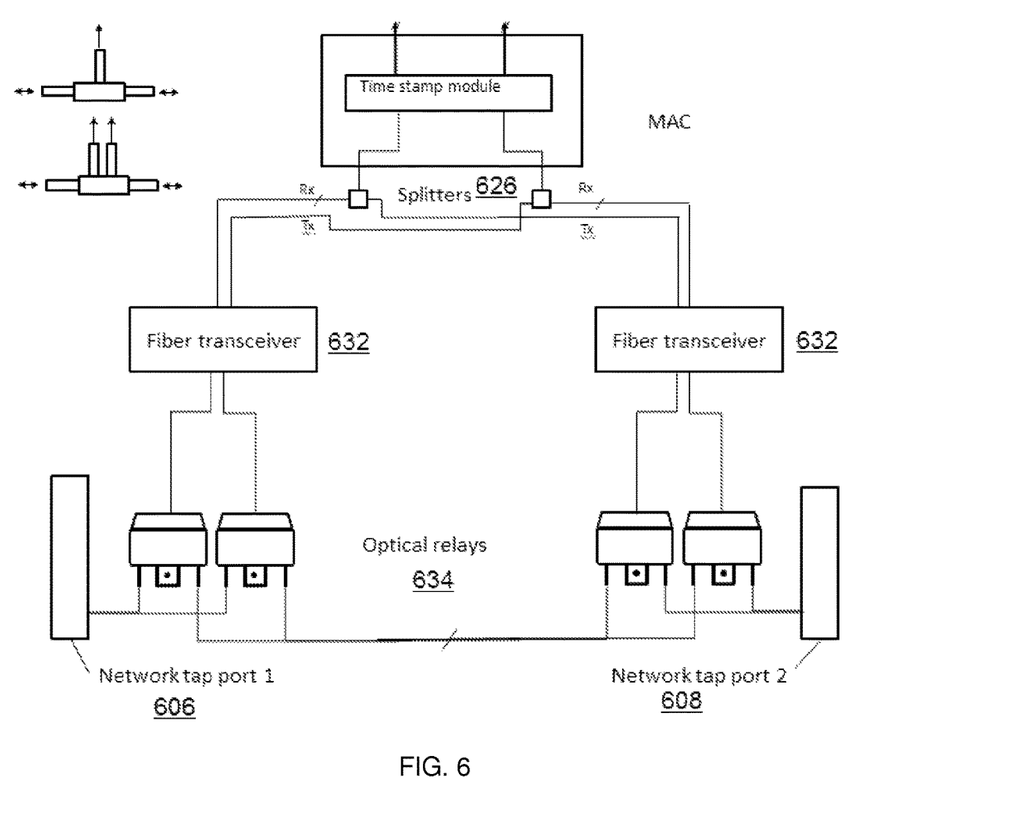
FIG. 6 depicts a variant of the FIG. 5 embodiment wherein the fiber tap includes the additional pair of splitter elements.

In FIG. 6, the network tap element is a fiber tap. In this variant of FIG. 5, the two optical tap ports 606 and 608 are coupled to the fiber transceivers 632 via optical relays 634. The outputs of the fiber transceivers are provided to splitters 626. This embodiment thus provides for the fiber tap-analog to the embodiment shown in FIG. 4.

Figure 7:
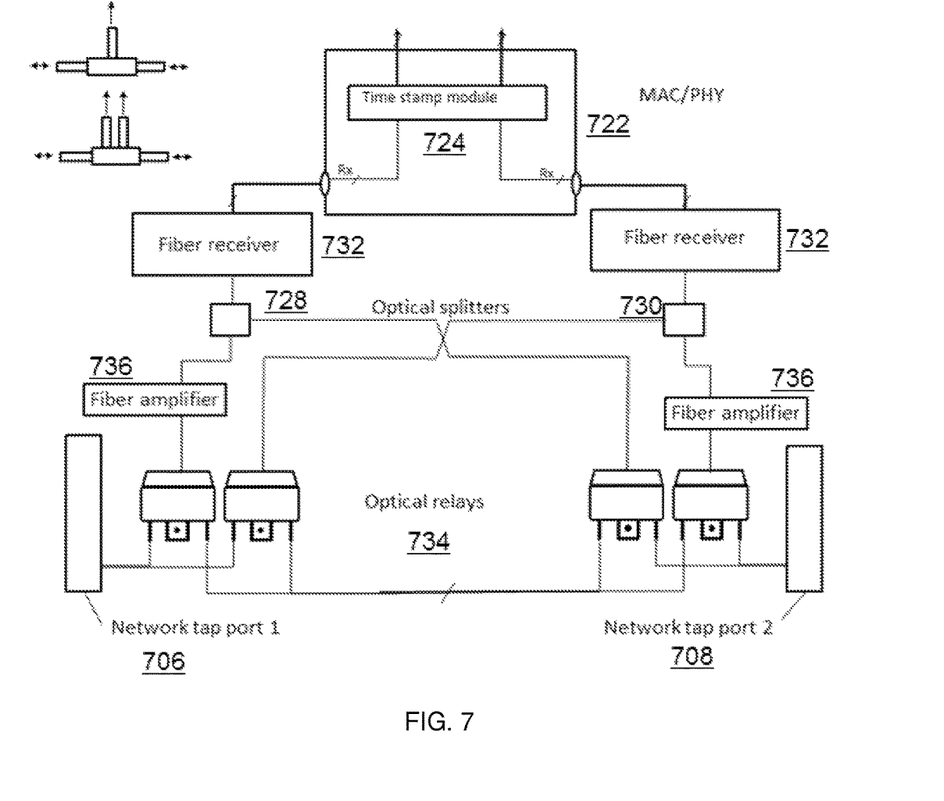
FIG. 7 depicts still another variant embodiment of a fiber tap.

In FIG. 7, the network tap element once again is a fiber tap. In this variant, the two optical tap ports 706 and 708 are coupled to the fiber receivers 732 (and thus the MAC/PHY 722 with its time stamp module 724) via optical relays 734, additional fiber amplifiers 736, and optical splitters 728 and 730. The fiber amplifiers provide for additional gain, which is useful when the tap is operated in a limited power-budget operating environment.

Although not depicted in detail, a skilled person will appreciate that other configurations may be implemented. The time stamp module can be implemented as a separate module (e.g., a FPGA) instead of being a component of the MAC. In a variant, the time stamp module can be part of the physical layer chip (PHY), or a component of other elements, e.g., a processing component (such as a CPU), or the like. The time stamp module may be implemented in hardware, firmware, software, or combinations thereof. A representative time stamp module of this type is described in U.S. Publication No. 2012/0128011, commonly-owned, the disclosure of which is incorporated herein by reference.

According to this disclosure, the digital communications receive signals from the physical layer chips (in FIG. 3 or FIG. 4) or from the fiber receiver (in FIG. 5, FIG. 6 or FIG. 7) represent the mirrored data packets (the "tapped" data). These receive signals are packet-based and thus comprise a stream of data packets. As depicted, the tapped data is forwarded to the time stamp module. The time stamp module generates a time stamp and inserts the time stamp in each packet, e.g., in the packet body or the packet header. According to this disclosure, the time stamp thus represents a "time" when the data packet content is considered to be generated at a sending node from which the tapped data originates. The inserted time stamp also may be compensated to account for the propagation time between the sending node and the network tap. This compensation may account for one or more of: the time spent in the generation of the data packet content, delay through the transmit protocol stack, delays associated with transmit hardware at the sender, cable delays, delays through network elements (switches, routers, etc.) on the network path between the sender and the network tap, as well as delay associated with the receive hardware at the network tap itself.

A packet time-stamped in this manner is then forwarded to one or more receivers (such as the recorder shown in FIG. 1) for additional processing. The use of a recorder is not intended to be limiting, as the forwarding operation may direct the time-stamped packet to any type of device. When the network tap element is a filterable network tap, this additional processing may include filtering by a packet filtering module, where any packet field in the packet can be used as a filtering criterion for either passing or dropping the packet. This forwarding operation typically involves sending the packet (now including the time stamp) to a physical layer chip in the recorder or other system via the MAC or directly.

Preferably, and before being inserted into the packet, the time stamp generated for a particular packet is adjusted for the propagation delay between the sending node and the network tap element. In addition, the time stamp may be adjusted for a time differences between when the packet was sent and when the data packet content was generated at the sending node. In either case, after the time stamp module inserts the time stamp in the packet, the module preferably recalculates or sets to zero a UDP checksum (if the received packet is a UDP packet and the time stamp is inserted in the UDP payload), and recalculates and inserts a new MAC checksum in the packet.

According to another aspect of this disclosure, the time-stamped packet generated in this manner is received at a processing element that then performs a performance measurement based at least in part on the time stamp that, in this approach and as described above, represents the time at which the data packet content is considered to have been generated by the sending node.

As described herein, each data packet in the tagged (mirrored) data is modified to include a time stamp. While it is known to include time stamps in data packets in the context of other types of network elements within a data communication network, such usage has been for other unrelated purposes, namely, to facilitate synchronization of clocks in networks, or to facilitate determination of delays that packets experience traveling through network nodes. In contrast, and according to this disclosure, the notion of providing a time stamp (in a particular data packet) as an indication of when content of the data packet is considered to have been generated at a sending time (irrespective of whether that content was in fact generated then) provides significant advantages. In this respect, the time stamp inserted by the time stamp module provides content generation information that is then available to some additional processing module (e.g., such as a performance monitor) that also uses the content information itself in connection with that processing. By including the time stamp (as a surrogate indicating when the data packet content is deemed to have been generated at the sending node), the processing module has additional important data to facilitate the processing of the data packet content information itself. In this respect, the time stamping here provides a way of augmenting or supplementing the data packet content with additional information that is valuable to the downstream processing elements.

As described above, the techniques of this disclosure facilitate monitoring, analysis, processing and recording of data packets. One exemplary embodiment is now described, although this description is not intended to limit the disclosed subject matter. In this embodiment, the techniques are implemented in a flight test data acquisition and recording system. In this example scenario, data acquisition modules are placed in an environment (e.g., an aircraft) to acquire data from a variety of data sources, such as simple transducers to complete avionics buses. The acquired data is fed into the data acquisition modules where they are time stamped using the module's synchronized clock. These modules transmit the data over a mixed 100 Mbps and 10GBE network to a recorder and real-time data processing systems. The recorder captures all system data by subscribing to predefined IP multicast streams. Preferably, the data acquisition modules carry a synchronized time-of-day clock that is maintained over the network using the IEEE Standard. 1588-2002 Precision Time Protocol (PTP) and PTP-aware Ethernet switches that further enhance the system's synchronization precision. Preferably, data is tagged at the source (or, if this is not possible, at the tap), allowing the data to be useful regardless of network transit time. The real-time data processing system selects parameters from the multicast messages, time-orders them using the time tags applied at the source, and then performs requested processing using the selected data.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose digital processing system selectively activated or reconfigured by a stored computer program. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The techniques herein provide for improvements to a technology or technical field, namely, performance measurement and monitoring data acquisition and recording systems, as well as improvements to the functioning of a network tap element itself, namely, by extending its conventional functionality as has been described.

Having described my invention, what I now claim is as follows:

1. A method operative in association with a network tap having network tap ports, comprising:
   at the network tap:
   receiving a data packet;
   generating a time stamp for the data packet so received, the time stamp for the data packet representing a time at which content of the data packet is deemed by the network tap to have been generated at a sending node from which the data packet originates, irrespective of whether the data packet was generated at the sending node at said time;
   inserting the time stamp in the data packet; and
   forwarding to a receiving device for additional processing the data packet including the time stamp.

2. The method as described in claim 1 further including:
   receiving the data packet including the time stamp; and
   performing an operation based at least in part on the received data packet including the time stamp.

3. The method as described in claim 1 wherein generating the time stamp further includes adjusting for a propagation delay between the sending node of the packet and the network tap.

4. The method as described in claim 1 further including adjusting the time stamp to account for a time difference when the packet was sent and when the data packet content is deemed to have been generated at the sending node.

5. The method as described in claim 1 wherein the data packet includes a User Datagram Protocol (UDP) payload, the method further including:
   modifying a checksum associated with the UDP payload to generate a modified UDP checksum; and
   recalculating and inserting into the packet at least one of: the modified UDP checksum, and a new MAC checksum.

6. The method as described in claim 1 further including filtering the data packet according to a filtering criterion.

7. The method as described in claim 1 wherein the network tap is one of: a copper tap, and a fiber tap.

8. The method as described in claim 1 further including:
   determining whether the tap element is in a given operating condition; and
   based on the determining, by-passing the time-stamp operation.

9. The method as described in claim 8 wherein the given operation condition is one of: a non-powered condition, a start-up condition, or a malfunction.

10. The method as described in claim 1 wherein the data packet is one of a set of data packets representing tapped data, the tapped data derived from digital communication receive signals, and wherein the method further includes splitting the digital communication receive signals into first and second sets, wherein a given one of the first and second sets represents the tapped data.

11. A network tap, comprising:
    first and second network tap ports;
    means for coupling to a controller, as digital receive communication signals representing tapped data, modulated communication signals received at the first and second network tap ports, the controller having a time stamp module associated therewith;
    the time stamp module operable to receive the digital receive communication signals and, for each data packet: (i) generate a time stamp representing a time at which content of the data packet is deemed by the network tap to have been generated at a sending node from which the tapped data originates, irrespective of whether the tapped data was generated at the sending node at said time, (ii) insert the time stamp in the data packet, and (iv) forward the data packet including the time stamp from the network tap for additional processing.

12. The network tap as described in claim 11 wherein the network tap is a copper tap and the means for coupling comprises one or more relays, one or more magnetic couplers, and one or more physical layer chips.

13. The network tap as described in claim 12 wherein the controller is a media access controller (MAC).

14. The network tap as described in claim 13 wherein the time stamp module is a component of the MAC.

15. The network tap as described in claim 11 wherein the network tap is a fiber tap and the means for coupling comprises one or more optical splitters, and one or more fiber receivers.

16. The network tap as described in claim 11 wherein the network tap is a filterable network tap.

17. The network tap as described in claim 11 wherein the means for coupling is further operative to determine whether the network tap is in a given operating condition and in response entering a fail-safe operating manner when the time stamp module is by-passed.

18. The network tap as described in claim 11 further means responsive to receipt of a link down event for re-setting the time-stamp module.

19. A data acquisition and recording system, comprising:
    a data recorder; and
    a network tap, comprising:
       first and second network tap ports;
       means for coupling to a controller, as digital receive communication signals representing tapped data, modulated communication signals received at the first and second network tap ports, the controller having a time stamp module associated therewith;
       the time stamp module operable to receive the digital receive communication signals and, for each data packet: (i) generate a time stamp representing a time at which content of the data packet is deemed by the network tap to have been generated at a sending node from which the tapped data originates, irrespective of whether the tapped data was generated at the sending node at said time, (ii) insert the time stamp in the data packet, and (iii) forward the data packet including the time stamp from the network tap to the data recorder for additional processing, the additional processing including at least one performance measurement.

20. The data acquisition and recording system as described in claim 19 further including a time synchronization mechanism based on Precisions Time Protocol (PTP).

* * * * *